(12) United States Patent
Dickerson, Jr.

(10) Patent No.: US 7,711,595 B2
(45) Date of Patent: May 4, 2010

(54) METHOD AND SYSTEM FOR GENERATING A VALUE PROPOSITION FOR A COMPANY IN AN INDUSTRY

(75) Inventor: Wayne Lewis Dickerson, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2064 days.

(21) Appl. No.: 09/940,974

(22) Filed: Aug. 28, 2001

(65) Prior Publication Data
US 2003/0046137 A1  Mar. 6, 2003

(51) Int. Cl.
G06F 17/30 (2006.01)
(52) U.S. Cl. ............................................. 705/10; 705/7
(58) Field of Classification Search ................... 705/7, 705/10
See application file for complete search history.

(56) References Cited

U.S. PATENT DOCUMENTS

| | | | |
|---|---|---|---|
| 5,006,998 A | | 4/1991 | Yasunobu et al. |
| 5,406,477 A | * | 4/1995 | Harhen .......................... 703/6 |
| 5,627,973 A | | 5/1997 | Armstrong et al. |
| 5,963,910 A | | 10/1999 | Ulwick |
| 6,154,731 A | | 11/2000 | Monks et al. |
| 6,169,979 B1 | | 1/2001 | Johnson |
| 6,195,643 B1 | | 2/2001 | Maxwell |
| 6,236,975 B1 | | 5/2001 | Boe et al. |
| 6,249,768 B1 | | 6/2001 | Tulskie, Jr. et al. |
| 6,249,769 B1 | | 6/2001 | Ruffin et al. |
| 6,321,205 B1 | * | 11/2001 | Eder ............................. 705/7 |
| 6,411,936 B1 | * | 6/2002 | Sanders ....................... 705/10 |
| 6,678,639 B2 | * | 1/2004 | Little et al. ................. 702/188 |
| 6,850,866 B2 | * | 2/2005 | Couchot et al. ............. 702/182 |
| 6,877,034 B1 | * | 4/2005 | Machin et al. .............. 709/223 |
| 2002/0091817 A1 | * | 7/2002 | Hill et al. .................... 709/224 |

OTHER PUBLICATIONS

Graff, Kevin and Ciuciura, Jan; Winning retail: a self assessment and instructional guide for independent retailers. Ottawa: Industry Canada, Service Industries, 1998. Chapters 2 and 11.*

* cited by examiner

*Primary Examiner*—Johanna Loftis
(74) *Attorney, Agent, or Firm*—Anna Linne; Hoffman Warnick LLC

(57) ABSTRACT

A method and system for generating a value proposition for a company in an industry is provided. Specifically, under the present invention, operational metrics and possible solutions are identified for the industry. Then, the impacts of the solutions on the operational metrics are assessed. Once the impacts have been assessed, a current operational performance of the company is compared to an operational performance of one or more companies within the industry to expose performance gaps. Then, a value proposition is generated by identifying a solution based the impacts to address the exposed performance gaps.

6 Claims, 3 Drawing Sheets

METHOD AND SYSTEM FOR GENERATING A VALUE PROPOSITION FOR A COMPANY IN AN INDUSTRY

BACKGROUND OF THE INVENTION

1. Technical Field

The present invention generally relates to a method and system for generating a value proposition for a company in an industry. More particularly, the present invention provides a method and system for improving a business value of the company by identifying an impact-assessed solution based upon the company's comparative operational performance.

2. Background Art

In business, a company's ability to maximize its operational performance in relation to the performance of its competitors is often the difference between success and failure. Accordingly, as the use of technology in business grows, companies are increasingly seeking high technology solutions to maximize their operational performance. Such solutions could include, for example, computer infrastructure, software, specialized labor, etc. It is often the case, however, that the health and viability of different industries are governed by different factors. Moreover, the true impact of solutions on a company is often not known prior to implementation. Accordingly, a set of solutions for industry "A" might not be appropriate for industry "B."

Heretofore, systems have been created to evaluate business requirements of a company and apply a solution to enhance the performance of the company. However, no such system first determines the key operational metrics that affect performance in the relevant industry prior to evaluating a particular company. Specifically, every industry has certain factors that determine the health and viability of a company therein. For example, in the grocery store industry, one operational metric could be the rate in which inventory is turned over. However, this metric might have no bearing in the accounting professional service industry. When operational metrics are accurately identified, gaps in performance of a particular company can be more accurately addressed. In addition, no existing system determines possible solutions for an industry prior to evaluating a company. Similar to operational metrics, solutions could vary depending on the particular industry. For example, in the accounting professional service industry, one possible solution could be to insert more trained accountants into the workforce. However, such a solution would yield little or no benefit for the grocery store industry.

Another drawback with existing systems is the failure to determine the impact that the solutions will have on the operational metrics. Without doing this, it is impossible to predict the effect a solution would have on a company's performance. For example, in the grocery store industry, a solution could be to implement computer infrastructure to track shipments coming into a store. However, using such infrastructure could delay the inventory turnover rate and, thus, adversely affect a company's performance.

In view of the forgoing, there exists a need for a method and system for generating a value proposition for a company in an industry. Specifically, there exists a need for a method and system that increases the business value of a company by identifying a solution based upon its impacts as well as any performance gaps. In addition, there exists a need for such a method and system to first identify operational metrics and possible solutions for the relevant industry, and then assess the impacts of the solutions on the metrics.

SUMMARY OF THE INVENTION

The present invention overcomes the drawbacks of existing systems by providing a method and system for generating a value proposition. Specifically, the present invention provides a method and system for increasing the business value of a company in an industry by identifying a solution based upon its impact and the company's performance gaps. In general, the method and system will first identify operational metrics and possible solutions for the particular industry. Then, the impact of the solutions on the operational metrics will be assessed. Once assessed, the average operational performance of the company will be compared to the average operational performance of one or more companies in the industry to expose any performance gaps. Based upon the exposed gaps and the impacts, a solution will be identified to improve the business value of the company.

According to a first aspect of the present invention, a method for identifying a solution to improve a business value of a company in an industry is provided. The method comprises the steps of: (1) identifying operational metrics for the industry; (2) assembling a set of solutions for the industry; (3) assessing impacts of the solutions on the operational metrics; (4) comparing a current operational performance of the company to an operational performance of another company within the industry to expose performance gaps; and (5) identifying a solution based upon the impacts to address the exposed performance gaps.

According to a second aspect of the present invention a method for generating a value proposition for a company in an industry is provided. The method comprises the steps of: (1) identifying operational metrics for the industry; (2) assembling a set of solutions for the industry; (3) assessing impacts of the solutions on the operational metrics; (4) comparing a current operational performance of the company to an average operational performance of companies within the industry to expose performance gaps; and (5) generating a value proposition by identifying a solution based upon the gaps and the impacts.

According to a third aspect of the present invention a method for generating a value proposition for a company in an industry is provided. The method comprises the steps of: (1) identifying operational metrics for the industry; (2) assembling a set of solutions for the industry; (3) assessing impacts of the solutions on the operational metrics; (4) comparing a current operational performance of the company to an average operational performance of companies within the industry to expose performance gaps, after the assessing step; and (5) generating a value proposition by identifying a solution based upon the gaps and the impacts that improves a business value of the company.

According to a fourth aspect of the present invention, a system for generating a value proposition for a company in an industry is provided. The system comprises: (1) an information system for receiving operational metrics and a set of solutions for the industry; (2) an assessment system for assessing impacts of the solutions on the operational metrics; (3) a comparison system for comparing an operational performance of the company to an operational performance of another company within the industry to expose performance gaps; and (4) a generation system for generating a value proposition by identifying a solution based upon the impacts to address the exposed performance gaps.

According to a fifth aspect of the present invention, a system for generating a value proposition for a company in an industry is provided. The system comprises: (1) an information system for receiving operational metrics, a set of solutions for the industry, operational performance data of the company, and average operational performance data of companies within the industry; (2) an assessment system for assessing impacts of the solutions on the operational metrics; (3) a comparison system for comparing an operational performance of the company to an average operational performance of the companies within the industry to expose performance gaps; and (4) a generation system for generating a value proposition by identifying a solution based upon the impacts to address the exposed performance gaps.

According to a sixth aspect of the present invention, a program product stored on a recordable medium for generating a value proposition for a company in an industry is provided. When executed, the program product comprises: (1) program code configured to receive operational metrics and a set of solutions for the industry; (2) program code configured to assess impacts of each solution on the operational metrics; (3) program code configured to compare a current operational performance of the company to an operational performance of another company within the industry to expose performance gaps; and (4) program code configured to generate a value proposition by identifying a solution based upon the gaps and the impacts.

According to a seventh aspect of the present invention, a program product stored on a recordable medium for generating a value proposition for a company in an industry is provided. When executed, the program product comprises: (1) program code configured to receive operational metrics, a set of solutions for the industry, operational performance data of the company, and average operational performance data of companies within the industry; (2) program code configured to determine impacts of the solutions on the operational metrics; (3) program code configured to compare an operational performance of the company to an average operational performance of the companies within the industry to expose performance gaps; and (4) program code configured to generate a value proposition by identifying a solution based upon the impacts to address the exposed performance gaps.

Therefore, the present invention provides a method and system for generating a value proposition for a company in an industry.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
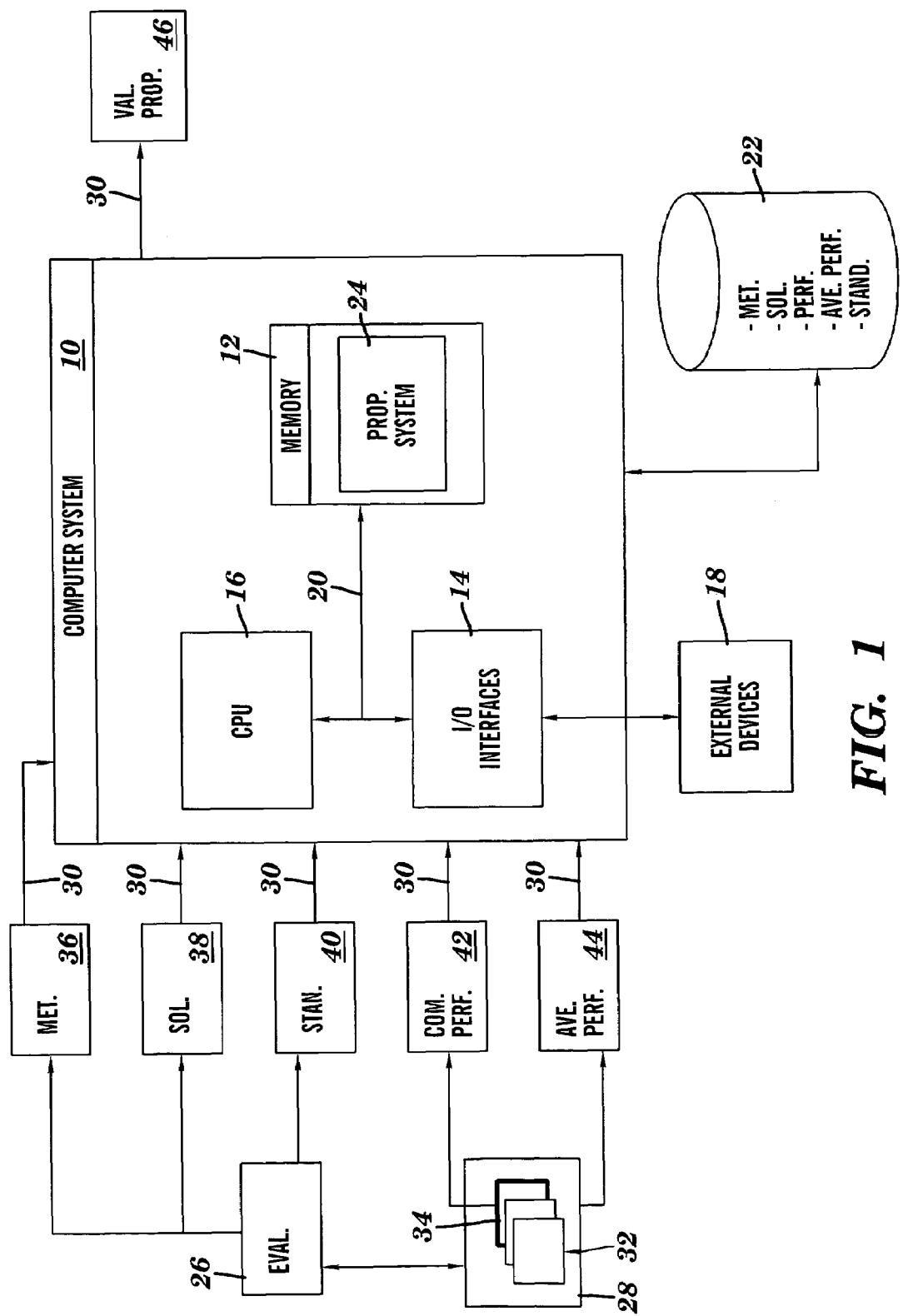
FIG. 1 depicts a computer system having a proposition system according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the description will have the following sections:
I. Definitions
II. General
III. Computer System
IV. Proposition System I. Definitions Operational Metric—a factor used to measure the health and/or viability of a company in a particular industry.

Operational Performance—the performance of a company based upon the operational metrics for the particular industry.

Value Proposition—a solution that improves the business value of a company.

Performance Gap—the difference in operational performance of a company when compared to the operational performance of one or more other companies in the industry.

Solution—a decision, action, product and/or service that impacts a recognized problem in a positive manner.

II. General

In general, the present invention provides a method and system for generating a value proposition for a company in an industry. First, the operational metrics for the relevant industry will be identified. Operational metrics are the factors that measure the health and/or viability of a company in the industry. For example, the grocery store industry could have operational metrics that include: (1) the rate of inventory turnover; and (2) the number of customers per day. As indicated above, each industry could have different operational metrics. Thus, identifying the operational metrics for the particular industry prior to evaluating a company allows a significantly more effective analysis to be performed.

Similarly, a set of solutions for the industry as a whole will be assembled. The solutions could be any decision, action, product and/or service (e.g., computer infrastructure, software, manpower, consulting arrangement, etc.) that solves a recognized problem in the industry. Once assembled, the impacts of the solutions on the operational metrics will be assessed. Specifically, it must be determined which operational metrics will benefit and/or will be harmed by the solution. In some cases, several solutions may benefit a particular operational metric. However, one solution might be more beneficial than others. Alternatively, one solution might benefit one operational metric while harming another. In either case, these impacts should be assessed. In addition, conflict resolution rules should be utilized when a solution has a positive impact on one operational metric but a negative impact on another. For example, solution "A" in the grocery store industry might make the consumer check out process more efficient and thus increase the number of customers per day. However, solution "A" might also drastically reduce the inventory turnover rate, which might be more harmful to the company than having a lower number of customers per day. In such a case, the conflict resolution rules would dictate whether the solution should be identified for implementation.

After the impacts of the solutions have been assessed, the operational performance of the company will be compared to the operational performance of one or more companies in the industry to expose any performance gaps. This is generally done in relation to the identified operational metrics. For example, using the inventory turnover rate operational metric, grocery store "A" might have an inventory turnover rate of 50% every seven days, whereas the grocery stores "B," "C," and "D" average 75% every seven days. Thus, grocery store "A" has a performance gap of 25% every seven days. It should be understood that the operational performance of company "A" need not be compared to multiple other companies, or the industry as a whole. Rather, the operational performance of company "A" could be compared to that of a single competing company (as will be further described below). Based upon the exposed performance gaps and the assessed impacts, a value proposition will be generated. Specifically, solutions that increase the business value of the company by addressing the exposed performance gaps will be identified. However, in identifying a solution, its impact is also considered. For example, if solution "A" would improve the number of customers per day but also drastically harm the inventory turnover rate, it should be determined whether the solution should nevertheless be implemented. Since the solutions are identified, in part, based upon their assessed impacts, the best possible solutions will be identified for implementation.

It should be understood that the present invention is intended to be performed in a closed-loop manner. That is, the present invention can be repeatedly performed (e.g., on a scheduled basis) so that a company can be periodically analyzed. Related systems are open-loop, that is, run once or upon demand. In addition, it should be appreciated that the present invention can be implemented as a computer-based system or manually by an individual. Specifically, an individual "evaluator" could perform all of the above-indicated steps of the present invention without using a computer-based system.

III. Computer System

Referring now to FIG. 1, a computer system 10 implementation of the present invention is shown. Computer system 10 generally comprises memory 12, input/output interfaces 14, a central processing unit (CPU) 16, external devices/resources 18, bus 20, and database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is proposition system 24 (shown in FIG. 1 as a software product). Proposition system 24 will be described in more detail below but generally comprises a method and system for generating value proposition 46 for company 34 in industry 28. Specifically, proposition system 24 receives operational metrics 36, solutions 38, and standards 40 relating to industry 28 from evaluator 26. Industry 28 comprises a set of companies 32 and, as explained above, each industry could have different operational metrics 36 and solutions 38. Accordingly, each industry should be independently analyzed by evaluator 26 to accurately determine all applicable operational metrics 36 and solutions 38. Once operational metrics 36 and solutions 38 have been identified/assembled, the impacts of solutions 38 on operational metrics 36 should also be assessed. For example, as indicated above, solutions "A," "B," and "C" might all benefit the number of customers per day. However, solution "A" might work the best. Alternatively solution "A" might improve the number of customers per day, but it might also reduce the inventory turnover rate. Each such impact should be assessed so that only the best possible solutions are identified for implementation. Standards 42 provide the impacts (risk/benefit) for each solution as well as conflict resolution rules (as will be further described below). Evaluator 26 is preferably an expert individual or system that has been trained/programmed to determine operational metrics 26, solutions 38, and standards 40 for industry 28. This is preferably done, in part, by communicating with company 34 and industry 28 to obtain the most accurate information.

Once operational metrics 36 have been identified, solutions 38 have been assembled, and the impacts have been assessed, company 34 can be analyzed for performance gaps. Specifically, proposition system 24 will receive company performance data 42 and average performance data 44. Company performance data 42 relates to the operational performance of the company 34 being evaluated. Average performance data relates to the operational performance of one or more companies 32 in industry 28. It should be realized that such performance data can be received by proposition system 24 directly from industry 28 and company 34, from evaluator 26, or from a third party source (i.e., purchased from a third party). Since evaluator 26 will communicate with industry 28 and/or company 34 to determine operational metrics 36, solutions 38, and standards 40, company performance data 42 and average performance data 44 could be also communicated to evaluator 26 from industry 28.

Once all necessary information has been received it can be stored in database 22. Proposition system 24 will use the received performance data to compare the operational performance of company 34 to the operational performance of one or more other companies 32 in industry 28 to expose any performance gaps. For example, if company 34 is a grocery store that has an inventory turnover rate of 50% every seven days, while the other companies 32 in industry 28 have an average inventory turnover rate of 75% every seven days, a gap of 25% over seven days is exposed. It should be understood, however, that the operational performance of company 34 need not be compared to the average operational performance of industry 28 as a whole. For example, the operational performance of company 24 could be compared to an individual company in industry 28 (as will be further described below).

Based upon the assessed impacts and the exposed performance gaps, one or more solutions are identified (i.e., a value proposition 46 is generated). To base the solutions upon the impacts and the gaps, standards 40 are utilized. Specifically, standards 40 could not only provide the risk and benefit of each solution, but could also provide conflict resolution rules for dictating when a solution should be identified for implementation. For example, if a grocery store was sub-par in the rate in which customers were checked out, a possible solution could be to implement better computer infrastructure. However, if this solution would somehow result in a five day delay in the inventory turnover rate, the solution might not be identified by proposition system (e.g., if inventory turnover is a more important operational metric than check out rate). Standards 40 are preferably provided in a table format that not only correlates solutions to performance gaps (i.e., provides the risks/benefits of each solution), but also dictates conflict resolution rules. Since the solutions are identified based upon the impacts and the performance gaps, they are tailored to increase business value of company 34.

It should be appreciated that once all operational metrics 36, solutions 38, and standards 40 have been provided, proposition system 24 could run this analysis at scheduled intervals by obtaining the necessary company performance data 42 and average performance data 44.

Database 22 provides storage for information necessary to carry out the present invention. Such resources could include, inter alia: (1) operational metrics 36; (2) solutions 38; (3) standards 40; (4) customer performance data 42; and (5) average performance data 44. Database 22 may include one or more storage devices, such as a magnetic disk drive or an optical disk drive. In another preferred embodiment database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Communication with computer system 10 occurs via communication links 30. Communications links 30 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

IV. Proposition System

Figure 2:
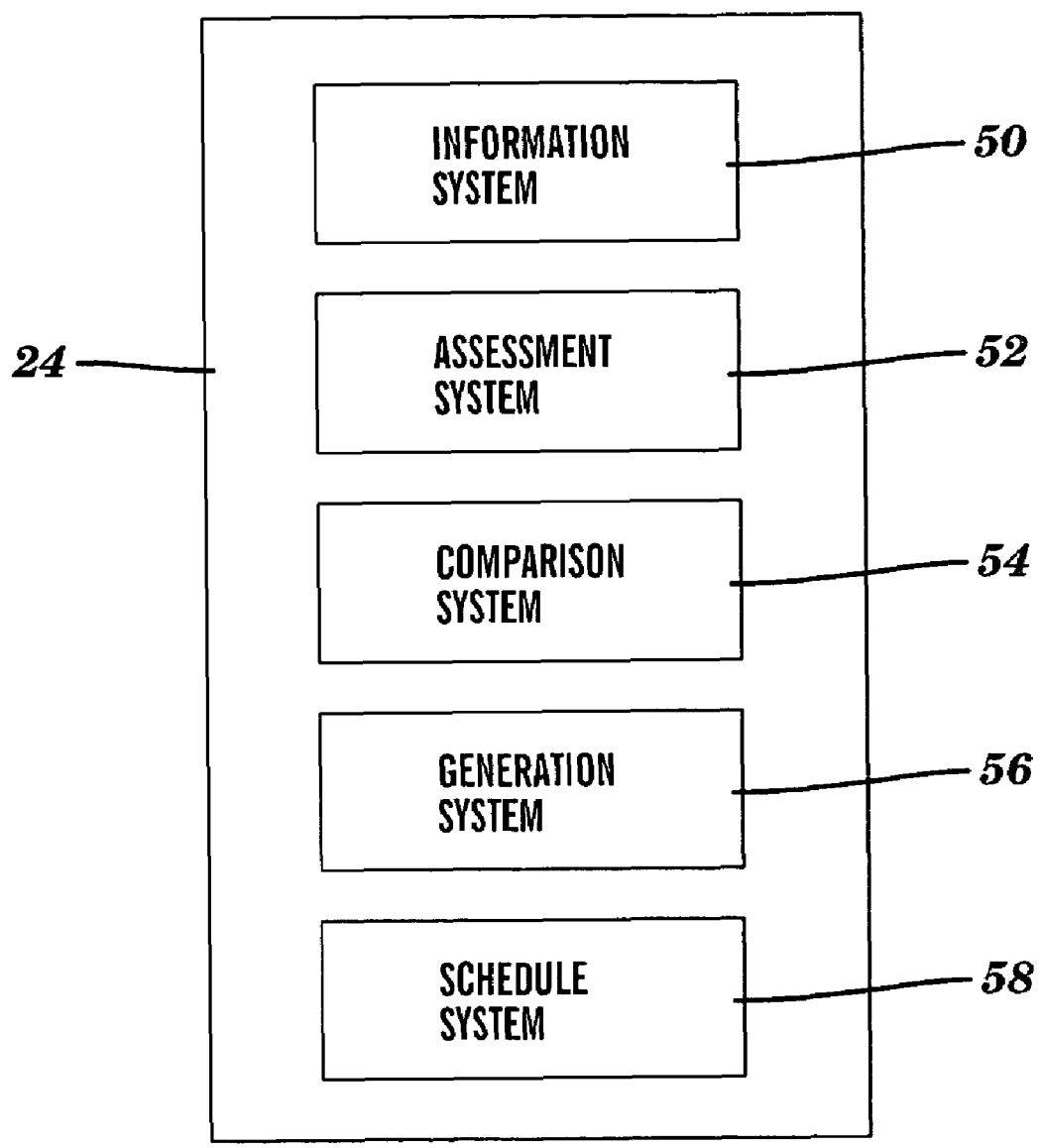
FIG. 2 depicts a box diagram of the proposition system of FIG. 1.

Referring now to FIG. 2, a more detailed depiction of proposition system 24 is shown. Specifically, proposition system includes information system 50, assessment system 52, comparison system 54, generation system 56, and schedule system 58. Information system 50 will receive the operational metrics, solutions, impacts, standards, company performance data, and average performance data so that an analysis can be performed. Once received, this information is preferably stored in the database. This allows information from numerous companies and industries to be collected. When an analysis of a particular company is desired, assessment system 52 will assess the corresponding impacts based upon the standards. Comparison system 54 will then compare the operational performance of the company to the operational performance of one or more companies in the industry to expose any performance gaps. In a preferred embodiment, the operational performance of the particular company is compared to the average operational performance of the industry as a whole (i.e., all other companies). In an alternative embodiment, the operational performance of the particular company is compared a single or group of competing companies. This allows comparisons to be made on a "best of class basis." Specifically, it could be advantageous to compare the operational performance of a company to that of different competing companies depending on the operational metric at issue. For example, the operational performance of company "A" could be compared to that of company "B" for inventory turnover rate, while being compared to company "C" for the number of customers per day. In either event, the operational performance of a company being evaluated will be compared to the operational performance of one or more companies in the industry to identify any performance gaps.

Based upon the gaps and the assessed impacts, generation system 56 will generate a value proposition. Specifically, once the performance gaps have been exposed, generation system 56 will identify an appropriate solution based upon the impacts and conflict resolution rules delineated in the standards. As indicated above, the standards are preferably a table or the like that includes solutions, their impacts, and any necessary conflict resolution rules. Schedule system 58 allows an analysis of a company to be performed at scheduled intervals. This allows the present invention to be implemented as a closed-loop system. That is, a company can be repeatedly analyzed in a continuing effort to improve its business value.

It should be understood that the embodiment of proposition system 24 shown in FIG. 2 is intended to be illustrative only and other variations could exist. For example, the functions of proposition system 24 could be performed by a different quantity of sub-systems than is shown.

Figure 3:
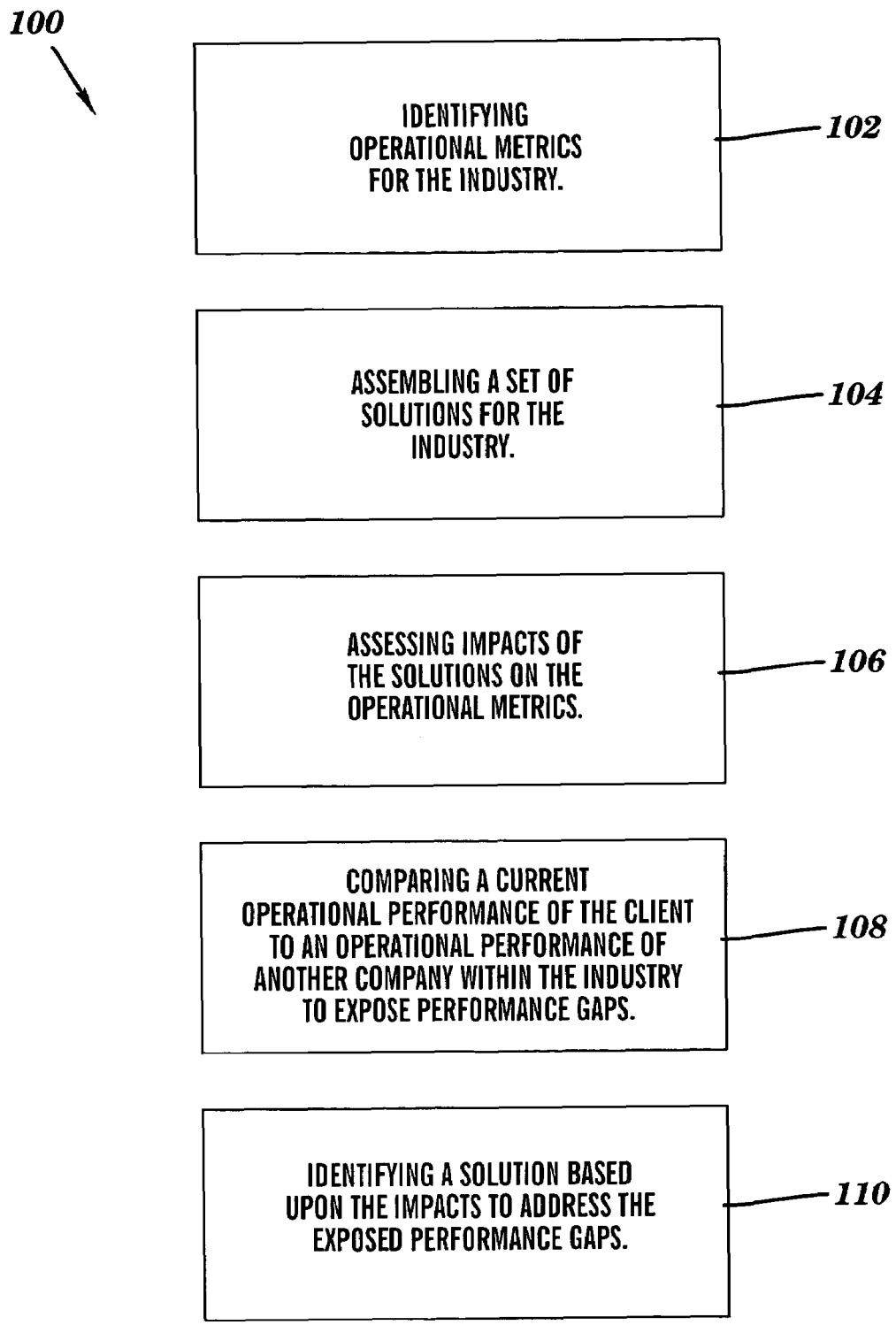
FIG. 3 depicts a method flow chart according to the present invention.

Referring now to FIG. 3, a method 100 according to the present invention is shown. First step 102 is to identify operational metrics for the industry. Second step 104 is to assemble a set of solutions for the industry. Third step 106 is to assess impacts of the solutions on the operational metrics. Fourth step 108 of method 100 is to compare a current operational performance of the company to an operational performance of another company within the industry to expose performance gaps. Fifth step 110 is to identify a solution based upon the impacts to address the exposed performance gaps.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computerized method for identifying a solution to address exposed performance gaps of a company in a specific industry, comprising:

first identifying a plurality of operational metrics for the specific industry, wherein the operational metrics includes a factor used to measure health or viability of a generic company in the specific industry, wherein the specific industry is a grocery store industry, wherein the operational metrics include at least one of a rate of inventory turnover and a number of customers per day;

assembling on a computer device a set of solutions for application by the specific industry, wherein the set includes one of a decision, an action, a product, and a service;

assessing, by a proposition system, impacts of application of the set of solutions on the operational metrics for the specific industry, wherein the assessing includes determining which of the set of solutions has a negative impact on an operational metric and determining which of the set of solutions has a positive impact on the operational metric;

after identifying, assembling, and assessing, then comparing a current operational performance of the company to an operational performance of another company within the specific industry to obtain at least one performance gap, wherein the operational performance includes a performance of a company based upon the operational metric for the specific industry;

identifying a solution based upon the impacts to address the exposed performance gaps, wherein the solution is at least one of a decision, an action, a product, and a service that impacts a problem in a positive manner; and outputting the solution from the computer system.

2. The method of claim 1, wherein the determining further comprises:

applying a set of conflict resolution rules when a solution has a positive impact on a first operational metric and a negative impact on a second operational metric; and then determining from the applying whether the solution should be identified for implementation.

3. The method of claim 1, wherein identifying the plurality of operational metrics, assembling, assessing, comparing, identifying the solution, and outputting steps are repeated automatically at a scheduled interval.

4. The method of claim 1, wherein the another company is a best in class company in the specific industry.

5. A computerized method for generating a value proposition for a company in a specific industry in a computer system, comprising the steps of:

first identifying a plurality of operational metrics for the specific industry, wherein the operational metrics include a factor used to measure health or viability of a generic company in the specific industry, wherein the specific industry is a grocery store industry;

assembling on a computer device a set of solutions for application by the specific industry, wherein the set includes one of a decision, an action, a product, and a service;

assessing, by a proposition system, impacts of application of the set of solutions on the operational metrics for the specific industry, wherein the assessing includes determining which of the set of solutions has a negative impact on an operational metric and determining which of the set of solutions has a positive impact on the operational metric;

after identifying, assembling, and assessing, then comparing a current operational performance of the company to an average operational performance of companies within the specific industry to expose at least one performance gap, wherein the current operational performance of the company includes a performance of the company based upon the operational metric for the specific industry;

generating a value proposition by identifying a solution based upon the gaps and the impacts, wherein the solution is at least one of a decision, an action, a product, and a service that impacts a problem in a positive manner; and outputting the value proposition from the computer system.

6. A computerized method for generating a value proposition for a company in a specific industry in a computer system, comprising the steps of:

first identifying operational metrics for the specific industry, wherein the operational metrics includes a factor used to measure health or viability of a generic company in the specific industry, wherein the specific industry is a grocery store industry;

assembling on a computer device a set of solutions for application by the industry, wherein the set includes one of a decision, an action, a product, and a service;

assessing, by a proposition system, impacts of application of the solutions on the operational metrics for the specific industry, wherein the assessing includes determining which of the set of solutions has a negative impact on an operational metric and determining which of the set of solutions has a positive impact on the operational metric;

after identifying, assembling, and assessing, then comparing a current operational performance of the company to an average operational performance of companies within the specific industry to expose performance gaps, wherein the current operational performance includes a performance of a company based upon the operational metric for the specific industry;

generating a value proposition by identifying a solution based upon the gaps and the impacts that improves a business value of the company, wherein the solution is at least one of a decision, an action, a product, and a service that impacts a problem in a positive manner; and outputting the value proposition from the computer system.

* * * * *